March 30, 1926.
L. S. DOWNS
TIRE VALVE CLOSURE
Filed Jan. 14, 1925
1,578,961
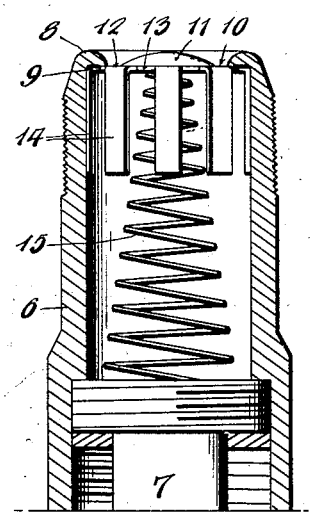
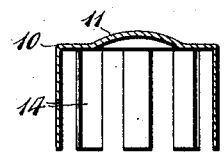
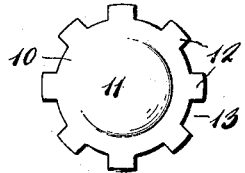
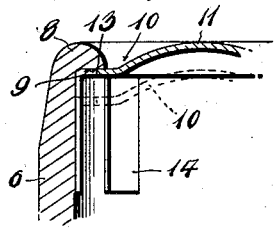
INVENTOR.
Lincoln S. Downs
BY John A. Bommhardt
ATTORNEY.

Patented Mar. 30, 1926.

1,578,961

UNITED STATES PATENT OFFICE.

LINCOLN S. DOWNS, OF EAST CLEVELAND, OHIO.

TIRE-VALVE CLOSURE.

Application filed January 14, 1925. Serial No. 2,367.

*To all whom it may concern:*

Be it known that I, LINCOLN S. DOWNS, a citizen of the United States, residing at East Cleveland, in the county of Cuyahoga and State of Ohio, have invented certain new and useful Improvements in Tire-Valve Closures, of which the following is a specification.

This invention relates to improvements in tire valve closures.

An object of this invention is to provide a yieldable closure for a tire valve, this closure being movable to open position upon attachment of an air pump hose nozzle or the like and automatically returnable to closed position with removal of the inflating pump hose nozzle.

A further object is to provide in a closure of this type, a structure such as will assure accurate seating of the closure disc under all conditions.

It is likewise an object to provide a tire closure constructed of sheet metal and comprising a minimum number of parts which may be easily and comparatively inexpensively manufactured.

Other objects will be in part obvious and in part pointed out hereinafter.

In order that the invention and its mode of operation may be readily understood by those skilled in the art, I have in the accompanying illustrative drawings and detailed description pointed out one possible embodiment of the same.

Figure 1 is a vertical longitudinal sectional view showing the application of my improved closure to a tire valve cap;

Figure 2 is a detail cross-sectional view of the closure disc and guide legs;

Figure 3 is a top plan view thereof; and

Figure 4 is a detail sectional view illustrating the relation of the closure disc and the tire valve cap.

While this type of closure is capable of use in many ways other than that illustrated, I, in this application have shown the closure in association with a tire valve cap.

Having more particular reference to the drawings throughout which similar characters of reference designate similar parts, this improved closure may be broadly stated as comprising a sheet metal disc normally retainable in closed position in a valve cap by means of the coil expansion spring as clearly illustrated in Figure 1 of the accompanying drawings.

The tire valve cap comprises an elongated body 6 having a bore in one end of which is disposed a headed stem 7, this stem being adapted for insertion in the ordinary standard tire valve. The outer end portion of this hollow body is turned inwardly as shown in Figures 1 and 4 to form an annular rib or bead 8 through which formation I provide a shoulder 9 designed for engagement with portions of a closure disc 10. The relation of this closure disc and the shoulder 9 is clearly illustrated in Figure 4 of the accompanying drawings.

The closure disc 10 is preferably stamped from a single piece of sheet metal and as shown in Figures 2 and 3 comprises a central or body portion which is preferably though not necessarily circular in configuration. The central or body portion is preferably stamped outwardly as at 11 whereby to form a pocket in which one end of an expansion coil spring may seat. The diameter of this closure disc is slightly less than the diameter of the bore of the body 6 for reasons which will be hereinafter apparent.

As a means for assuring proper seating of this closure disc 10 I form at circumferentially spaced points radial fingers 12 whose formation results in the provision of notches or recesses 13 through which air enters a tire during the inflation process. Arranged at right angles to these fingers 12 and formed as extensions thereof is a set of guide legs 14 which snugly engage the wall of the bore.

While other means may be employed to normally yieldably seat the closure disc upon the shoulder 9, I preferably employ a coil expansion spring 15 as shown in Figure 1, one end of this spring being received in the pocket of the closure disc 10 while inward movement or expansion of the spring is limited through positioning of a headed stem 7 or the like to engage the inner end of the spring, as shown. Obviously other means may be employed for retaining the coil spring 15 in proper relative position.

With the elements relatively disposed as shown in Figure 1 the closure disc may be opened through moving it inwardly against pressure of the coil spring, this inward movement being effected either by hand or through engagement with the nozzle carried by an ordinary air pump hose. It is clear from Figure 4 that moving the disc 10 inwardly will permit air to enter a tire through the recesses or notches 13 and the ordinary standard valve (not shown).

With a structure as herein specified the necessity for removing a screw threaded closure member is eliminated and at the same time an absolutely reliable closure device is provided. The legs 14 as previously stated serve to accurately seat the closure disk upon the shoulder and prevent entry of foreign matter.

Certain minor changes in the details of construction may be resorted to and such of these changes as may fall within the scope of the appended claims, I consider within the spirit of my invention.

I claim:

1. In combination, a body having a bore, annular flat shoulder at one end of the bore, a closure disk, said disk being engageable with the shoulder, radial fingers on and in a plane with the body of the disk to space intermediate portions of the disk from the wall of the bore, guide legs on said fingers engageable with the bore wall, and spring means normally yieldably seating the disk upon the shoulder.

2. A closure disk comprising, a body portion, a set of circumferentially spaced radial fingers at the disk periphery, said fingers being in a plane with the disk body, and guide legs integral with the fingers and at right angles thereto.

In testimony whereof, I affix my signature.

LINCOLN S. DOWNS.